United States Patent [19]

Rath

[11] Patent Number: 5,251,968
[45] Date of Patent: Oct. 12, 1993

[54] BRAKING APPARATUS FOR A TWO-AXLE VEHICLE

[75] Inventor: Heinrich-Bernhard Rath, Vallendar, Fed. Rep. of Germany

[73] Assignee: Lucas Industries public limited company, Birmingham, England

[21] Appl. No.: 671,755

[22] PCT Filed: Jul. 17, 1990

[86] PCT No.: PCT/EP90/01165
§ 371 Date: Mar. 19, 1991
§ 102(e) Date: Mar. 19, 1991

[87] PCT Pub. No.: WO91/01235
PCT Pub. Date: Feb. 7, 1991

[30] Foreign Application Priority Data

Jul. 19, 1989 [DE] Fed. Rep. of Germany ....... 3923955
Nov. 7, 1989 [DE] Fed. Rep. of Germany ....... 3937070

[51] Int. Cl.⁵ .................... B60T 8/26; B60T 8/32
[52] U.S. Cl. .................... 303/9.62; 303/97; 303/100; 303/113.5; 188/349
[58] Field of Search .......... 303/113 AP, 100, 9.62, 303/9.71, 9.73, 104, 9, 2, 3, 9.61, 113.5, 97; 188/140 A, 349

[56] References Cited

U.S. PATENT DOCUMENTS 2,975,871 3/1961 Eckardt et al. ................. 188/140 A
4,735,279 4/1988 Sato ............................. 303/113 AP

FOREIGN PATENT DOCUMENTS 0062246 10/1982 European Pat. Off. ........... 303/9.62
0065151 11/1982 European Pat. Off. .
0288846 11/1988 European Pat. Off. .
3133442  3/1983 Fed. Rep. of Germany .
3312980 10/1984 Fed. Rep. of Germany .
3313078 10/1984 Fed. Rep. of Germany .
3345913  6/1985 Fed. Rep. of Germany ..... 303/9.62
3728480  1/1989 Fed. Rep. of Germany .
5449472  9/1977 Japan .......................... 303/9.62
0282156 12/1986 Japan .......................... 303/9.62

Primary Examiner—Robert J. Oberleitner
Assistant Examiner—Peter M. Poon
Attorney, Agent, or Firm—Oblon, Spivak, McClelland, Maier & Neustadt

[57] ABSTRACT

In a brake apparatus for a two-axle vehicle to obtain uniform wear of the brake linings a conventional ABS control device is so configured that on braking a braking pressure is supplied to the brakes of the rear wheels which is greater than a braking pressure supplied to the brakes of the front wheels for as long as the rotational deceleration of the rear wheels remains below a predetermined value.

14 Claims, 4 Drawing Sheets

BRAKING APPARATUS FOR A TWO-AXLE VEHICLE

The invention relates to a brake apparatus for a two-axle vehicle having rotational speed sensors at least at the rear wheels of the vehicle, a circuit for evaluating the rotational speeds and for determining the rotational deceleration of the wheels, and control means for controlling the braking pressures or braking moments obtained at the brakes of the front and rear wheels.

Brake apparatuses having the sensors, circuits and control means referred to above are generally known from conventional antilock brake systems (ALB brake systems).

In conventional brake systems, whether or not they are electronically controlled, irregular wear of the brake linings at the brakes of the front and rear wheels occurs. The brake pads or linings of the front wheel brakes are subjected to a higher load than the brake linings of the rear wheel brakes due to the partial shift of the vehicle weight which as a rule takes place on braking. This leads to irregular wear of the brake pads or linings and consequently the frequency of pad change is higher than in a vehicle in which all the brake linings wear uniformly and can be replaced all at once.

The objective of the invention is to further develop a brake apparatus of the type set forth at the beginning in such a manner that the brake pads or linings have a life which is as long and uniform as possible.

A brake apparatus according to the invention for achieving this objective is described in claim 1. Advantageous further developments are set forth in subsidiary claims 2 to 8.

The invention is based on the recognition that in motor vehicles, in particular automobiles, during normal driving operation far more than 90% of all braking operations subject the brakes to a relatively low stress. Typically, far less than 10% of all braking operations take place with a braking force of magnitude such that the retardation of the vehicle lies in a range above 0.2 g. With the usual adhesion coefficients (also referred to as braking force coefficients and denoted by $\mu$) above 0.4 it would therefore be possible for practically, all common automobile models to effect the brakings with a vehicle retardation of less than 0.2 g solely, via the rear axle of the vehicle.

The invention utilizes this knowledge and achieves a uniform wear of all the brake linings or pads of the vehicle in that the brakes of the rear wheels of the vehicle in "noncritical" braking situations are subjected to a braking force which is greater than the braking force obtained at the brakes of the front wheels at the same time. If the "noncritical" braking state ceases to be present, for example because the driver actuates the brake with more force and/or because due to the road conditions a tendency to lock occurs at the braked wheels, the increased loading of the rear wheel brakes provided according to the invention is immediately cancelled and all the brakes of the vehicle subjected to maximum braking, possibly under the control of a conventional antilock system.

A preferred further development of the invention provides that the brakes of the rear wheels of the vehicle have larger and/or more wear-resistant brake linings than the brakes of the front wheels. The greater loading of the brakes of the rear wheels according to the invention compared with the brakes of the front wheels then leads to the brake linings as a whole after a great number of braking operations with statistical distribution of the braking forces being uniformly, worn and it therefore being possible to replace them all at once after a relatively long life.

To implement the idea of the invention it is necessary to determine when the braking leaves the aforementioned "noncritical" state and becomes critical, i.e. requires an optimum use of all the braking means to obtain the shortest possible stopping distance. To determine such a transition from a noncritical to a critical state various criteria are available. These are mainly the rotational or angular retardations of the rear wheels subjected at the start of a braking according to the invention initially to a higher braking force than the front wheel brakes. If the rotational deceleration of one of the rear wheels exceeds a predetermined value (corresponding for example to 0.2 g) this indicates that the driver wishes to produce stronger braking and/or that the road conditions are relatively unfavorable and the brake apparatus according to the invention is then immediately switched over so that all available brakes are actuated with optimum braking pressure.

The means with which the braking pressures at the individual brakes of the wheels may be controlled are generally known today to the person skilled in the art, in particular from antilock control technology. The invention is therefore particularly suitable for implementation with an antilock control system known per se.

In addition or alternatively, to the rotational deceleration of the rear wheels, as a criterion for whether a braking state is "noncritical" or "critical" in the aforementioned sense the speed with which the driver actuates the brake pedal of the vehicle may be used. For this purpose, at the start of a braking operation the pedal travel per unit time can be measured or also the gradient with which the pressure of the hydraulic fluid in the master cylinder of the brake system rises. If the actuating speed of the pedals or the gradient of the rise of the braking pressure lies above a predetermined value the preference otherwise given according to the invention to the rear wheel braking does not take place and instead from the start maximum use of all brakes including the front wheel brakes is effected.

In a preferred further development of the invention at the start of a braking the pressure control means supplied to the brakes of the front wheels (as long as the rotational deceleration of the rear wheels remains beneath the predetermined value) only a relatively small pressure which leads only to application of the brake pads to just engage the brake disc without appreciable braking action. As a result, the brake discs of the front wheel brakes and also the brake linings are cleaned of any, possibly adhering water film and on subsequent use (transition to a "critical" braking state) are immediately available with full friction action.

In a further preferred embodiment of the brake apparatus according to the invention a possible transverse acceleration of the vehicle is used as control parameter. Means for determining the transverse acceleration of a vehicle are known per se. It is also known per se to determine the socalled yaw moment of the vehicle by means of an antilock system. For this purpose the measured rotational speeds of the wheels on opposite sides of the vehicle are compared with each other and evaluated. If a transverse acceleration and/or yaw moment results which lies or lie above a predetermined value, the emphasis of the braking action of the rear wheels compared with the front wheels otherwise provided according to the invention is immediately cancelled and the braking conducted in conventional manner, possibly with antilock control.

Preferably, the emphasis of the braking action at the rear wheels of the vehicle in accordance with the invention is provided only when the vehicle velocity is relatively small, for example less than 80 km/h.

The outer temperature obtaining can also be used as criterion for whether the emphasis of the braking action of the rear wheels compensating the lining wear is used or not. For if the outer temperature drops below a value of for example 2° C. this indicates a danger of icy roads and consequently in a preferred development of the brake system according to the invention the outer temperature is measured and then a normal braking carried out without the modification according to the invention.

In another preferred further development of the invention with means known per se the load at the rear axle of the vehicle is measured and possibly the load at the front axle. This is of advantage particularly with commercial vehicles with greatly varying rear axle loads. For this reason, in this example of embodiment of the invention emphasizing of the braking power at the rear wheels takes place only if the rear axle load exceeds a predetermined value, possibly in relationship to the front axle load.

Another brake apparatus according to the invention for achieving the aforementioned objective of high and uniform life of the brake linings or pads is later described.

This solution of the technical problem mentioned at the beginning of the irregular wear of the brake linings also has the aforementioned advantages which will consequently not be explained again.

With the solution described above an auxiliary brake present in any case in the vehicle is used. The auxiliary brake (e.g. a hand or parking brake) is actuable independently of the hydraulic brake control circuit and is used for as long as the rotational deceleration of the rear wheels remains below a predetermined value.

According to a further variant of the invention which is described the objective set forth at the beginning is achieved in that an auxiliary brake is provided at the rear wheels and is likewise actuable by, the hydraulic control circuit of the brake system and is actuated for as long as the rotational deceleration of the rear wheels remains below a predetermined value.

With a caliper disc brake, as auxiliary brake at the rear wheels a second caliper on the same disc of the brake of the rear wheel is possible or alternatively a second disc may be provided at each brake and equipped with its own caliper. In the case of a drum brake an additional drum may be provided for the auxiliary brake.

Hereinafter examples of embodiment of the invention will be explained in detail with the aid of the drawings, wherein.

Figure 1:
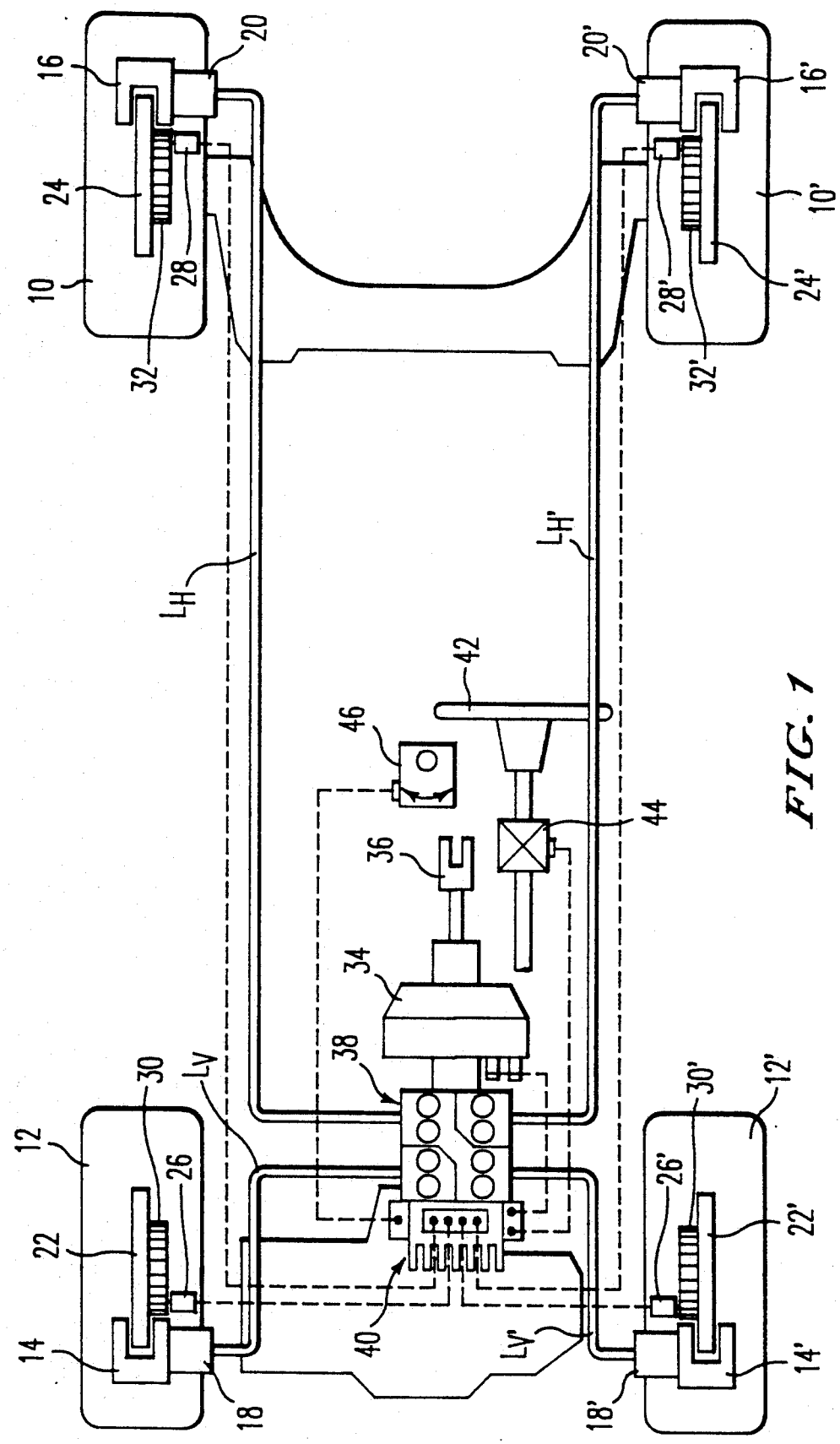
FIG. 1 shows schematically a brake apparatus having the components essential to the invention.

The brake apparatus illustrated according to FIG. 1 is used in an automobile having rear wheels 10, 10' and front wheel 12, 12'. The front wheels are provided with disc brakes 14, 14' and the rear wheels with disc brakes 16, 16'.

The brakes each have brake cylinders 18, 18' and 20, 20' as well as brake discs 22, 22' and 24, 24' as known per se.

Each wheel 10, 10' and 12, 12' is provided with an angular or rotational speed sensor 26, 26' and 28, 28' respectively likewise known per se. The rotational speed sensors are based in known manner on the principle of electromagnetic induction, a rotary ring 30, 30' or 32, 32' rotating with the wheels inducing in the rotational speed sensor a signal corresponding to the angular velocity of the wheel.

Furthermore, the brake system comprises in conventional manner a master brake cylinder 36 and a pressure distributor 38 with which the distribution of the braking pressure generated by means of the master brake cylinder to the individual brake cylinder 18, 18' and 20, 20' is controlled. The pressure-rise of the hydraulic fluid of the brake system generated by means of the master brake cylinder is measured by a measuring means 34. The measuring weans 34 determines the rate at which the hydraulic pressure of the master brake cylinder 36 rises per unit time. The braking pressures are transmitted by means of hydraulic conduits $L_V$, $L'_V$ (front wheels) and $L_H$, $L'_H$ (rear wheels).

In a particularly simple embodiment of the brake system a socalled "panic" braking of the driver (that is an emergency braking in which maximum braking action is necessary) can also be detected by the pedal travel on panic braking as a rule being appreciably greater than on relatively weak braking. In this simple embodiment of the invention an electrical switch is therefore connected to the pedal in such a manner that on a particularly violent and extended pedal movement a signal is generated which indicates a panic braking.

An antilock control circuit likewise known per se receives rotational speed signals from the rotational speed sensors 26, 26' or 28, 28' via lines indicated in dashed line and evaluates these signals in known manner to form in particular a rotational deceleration signal.

A steering wheel 42 of the vehicle actuates a steering angle sensor 44, the output signal of which is also entered into the antilock control circuit 40. In addition, a separate transverse acceleration sensor 46 likewise known per se may be provided, the output signal thereof being entered into the antilock control circuit 40.

Transverse acceleration sensors are known per se. It is also known to determine the transverse acceleration and also the socalled yaw moment with an antilock system without a separate measuring instrument. For this purpose the rotational speeds of the wheels on the left and right vehicle sides (seen in the travelling direction) are compared with each other.

The function of the brake apparatus shown in FIG. 1 is as follows.

If the driver of the vehicle increases the pressure in the master brake cylinder 36 in known manner by means of a brake pedal (not illustrated) the measuring means 34 measures the pressure rise per unit time (gradient). The measured value is entered into the antilock control circuit 40 and compared there with a predetermined comparison value. If the gradient of the pressure rise on starting a braking does not exceed a predetermined value the control of the braking pressures at the disc brakes 14, 14'; 16, 16' takes place according to the invention. If the gradient of the pressure rise exceeds a predetermined value the control of the braking pressures at the disc brakes does not take place in accordance with the invention.

Furthermore, the transverse acceleration state of the vehicle is measured. If the transverse acceleration measured by means of the transverse acceleration sensor 46 and/or the steering angle lock measured by means of the steering angle sensor 44 and/or a measured yaw moment exceeds or exceed a predetermined value or if a panic braking is detected, the control of the braking pressures is not in accordance with the invention. If the steering angle lock and the transverse acceleration do not exceed predetermined comparison values and no panic braking is present, the control of the braking pressures takes place in accordance with the invention. The aforementioned term "according to the invention" means the control described above and hereinafter. The expression "not according to the invention" means a conventional control with brake pressure generation at all four brakes 14, 14'; 16, 16', possibly with antilock control.

If the control of the braking pressures takes place according to the invention, firstly only, the brakes 16, 16' of the rear wheels 10, 10' are supplied via the conduits $L_H$, $L'_H$ with braking pressure. The antilock control circuit 40 controls corresponding valves of the pressure distributor 38. At the same time, via the conduits $L_V$, $L'_V$ a pressure is supplied to the disc brakes 14, 14' of the front wheels 12, 12' which is so low that the brakes are just in engagement, i.e. the brake linings just touch the brake discs 22, 22' and any liquid present which might impair a subsequent braking action is removed.

The antilock control circuit 40 periodically receives from the rotational speed sensors 26, 26'; 28, 28' rotational speed signals and evaluates the latter. Since initially only the rear wheels 10, 10' are braked, only their rotational deceleration can exceed a comparison value of for example 0.2 g stored in the antilock control circuit 40. If this happens the throttling of the braking pressure supply to the brakes 14, 14' of the front wheels 12, 12' is immediately cancelled and the front wheels are braked in conventional manner under the control of the antilock control circuit with maximum possible braking pressure. The same applies to the rear wheels 10, 10'.

If during a braking the steering angle sensor 44 and/or the transverse acceleration 46 indicate that the vehicle is undergoing a transverse acceleration the antilock control circuit 40 likewise-immediately initiates a "normal" braking, possibly with antilock control.

In addition, the vehicle speed is continuously measured. If the measured vehicle speed exceeds a predetermined value of for example 80 km/h the braking also takes place in a manner "not according to the invention", i.e. with regulation.

Figure 2:
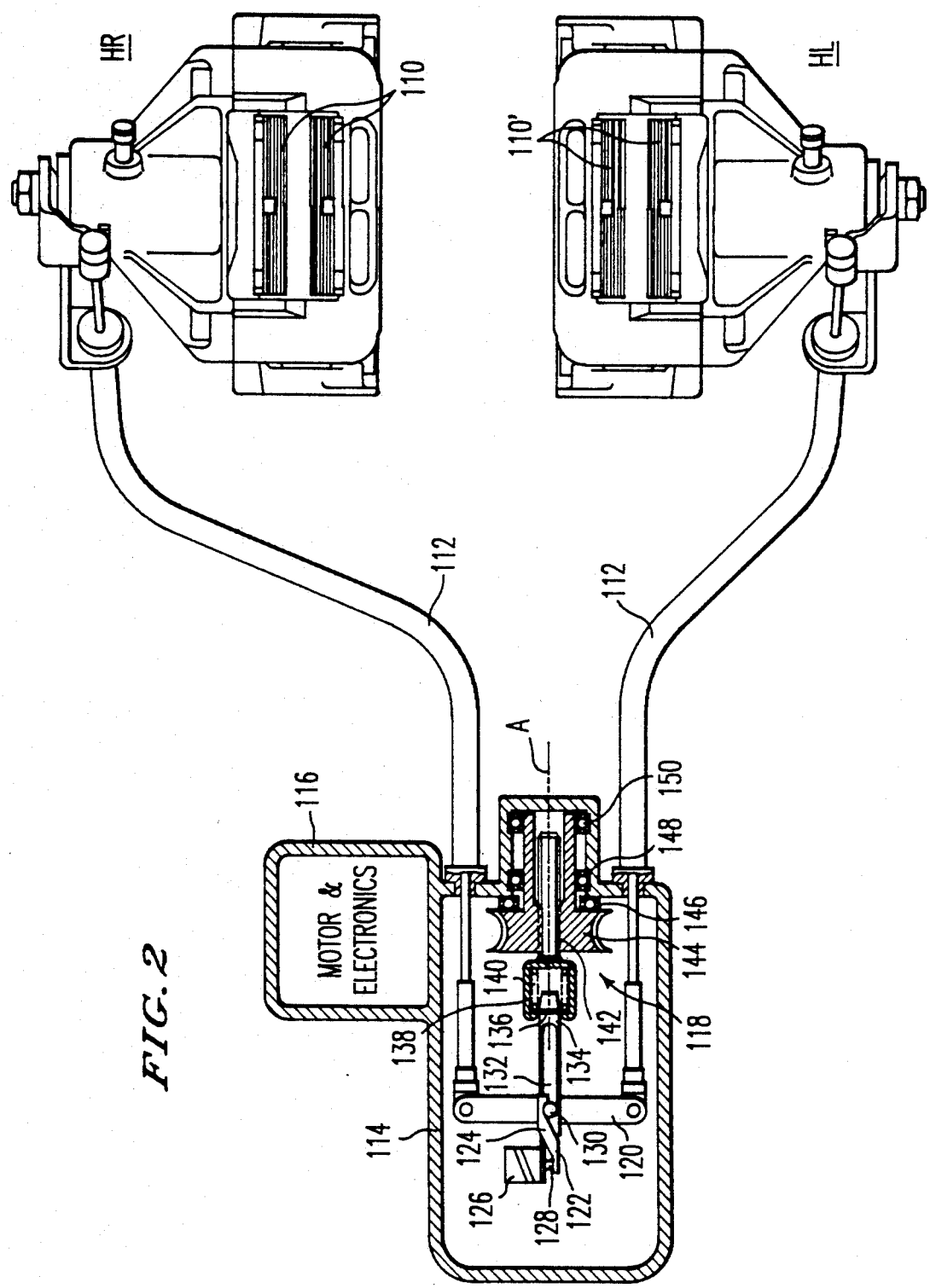
FIG. 2 shows schematically in section an auxiliary brake.

The auxiliary brake shown in FIG. 2 acts in a manner known per se on brake shoes 110, 110' of the brakes HR of the right rear wheel and HL of the left rear wheel. The braking force is transmitted by means of a Bowden cable 112.

The components necessary for generating a force on the Bowden cable 112 are arranged in a housing 114. The drive for generating the forces is arranged in a housing 116.

The means for generating a braking force which can be transmitted via the Bowden cable 112 are designated by the reference numeral 118. Both strings of the Bowden cable 112 are respectively attached to the ends of a movable beam 120. A blocking lever 122 holds the movable beam 120 in the left position shown in FIG. 2. The blocking lever 122 pivots about an axis 124. With the solenoid 126 a push member 128 is movable which acts on the blocking lever 122. If the push member 128 is pushed downwardly by the solenoid 126 in FIG. 2 the lever 122 pivots anticlockwise about the axis 124 and releases the movable beam. The position shown in FIG. 2 is the "normal position" of the movable beam 120. In this position the blocking lever 122 engages a pin 130 fixedly connected to the movable beam 120. Under specific conditions described in detail below the pin 130 is displaceable in a slot 132 formed in a fork head 134 engaging on both sides round the movable beam 120. At the end opposite the movable beam the fork head 134 is provided with a stop 136 arranged in a cage 138. Between the stop 136 and an end of the cage 138 opposite said stop in the direction of the longitudinal axis of the actuating means 118 a coil spring 140 is clamped. In the position shown in FIG. 2 the spring urges the stop 136 under bias to the left against a stop on the cage 138.

A rod 142 provided with an outer thread is connected to the cage 138. A worm drive 144 cooperates with the rod 142 and is rotatable about the axis A, the position of the rod 142 and cage 138 thereby changing in the direction of the longitudinal axis. The worm drive 144 is rotated by means of an electric motor arranged in the housing 116. If the worm drive 144 turns in a predetermined direction the rod 142 is moved to the left in FIG. 2. With the rod 142, the cage 138 also moves to the left. The spring 140 is so highly biased that firstly it does not change its position shown in FIG. 2 and it holds the stop 136 on the fork head in the extreme left position. As a result, on rotation of the worm drive 144 the fork head 134 also moves to the left. Since the blocking lever 122 is in the blocking position shown, the movable beam is also moved to the left and via the Bowden cable 112 generates braking forces at the two brakes HR and HL of the rear wheels of the two-axle vehicle. The spring 140 has a tensioning force such that a desired adequate mechanical braking of the rear wheels is effected. For example, the spring 140 may be configured so that in the case of an automobile a mechanical retardation of about 0.4 g is possible.

The electric motor arranged in the housing and rotating the worm drive 144 can be actuated in two different manners. Firstly, the driver of the motor vehicle can actuate a corresponding switch button completely independent of the hydraulic brake system (not shown) so that the motor arranged in the housing 116 turns the worm drive 144 to effect a socalled "handbraking" or also "mechanical braking". This, for this purpose the driver need not himself apply the mechanical forces. Secondly, however, the mechanical braking apparatus can also be used according to the invention when a "normal" braking of the hydraulic brake system is non-critical in the aforementioned sense, i.e. when the braking action lies beneath a predetermined value and the rear wheels are therefore far from any danger of locking so that said rear wheels can be subjected to a greater braking force than the front wheels. In this case the motor arranged in the housing 116 is automatically also actuated on actuation of the brake pedal of the hydraulic brake system so that the worm drive 144 turns and braking force is generated via the Bowden cable 112.

On an extremely high rotational deceleration and/or extremely large slip of the rear wheels the components 122 to 128 serve to immediately put the mechanical auxiliary brake out of operation. If the rotational speed sensors of the rear wheels (which may for example be used within the framework of a conventional antilock control) indicate that the rear wheels are approaching a critical state indicating a danger of locking, the electromagnetic solenoid 126 is immediately actuated and the push member 128 pushed downwardly in FIG. 2. The blocking lever 122 is then pivoted anticlockwise about the axis 124 and releases the pin 130 fixedly connected to the movable beam. Thus, the pin 130 can move in the slot 132 to the right in FIG. 2 and the Bowden cable 112 no longer transmits any braking force to the brakes of the rear wheels.

Figure 3:
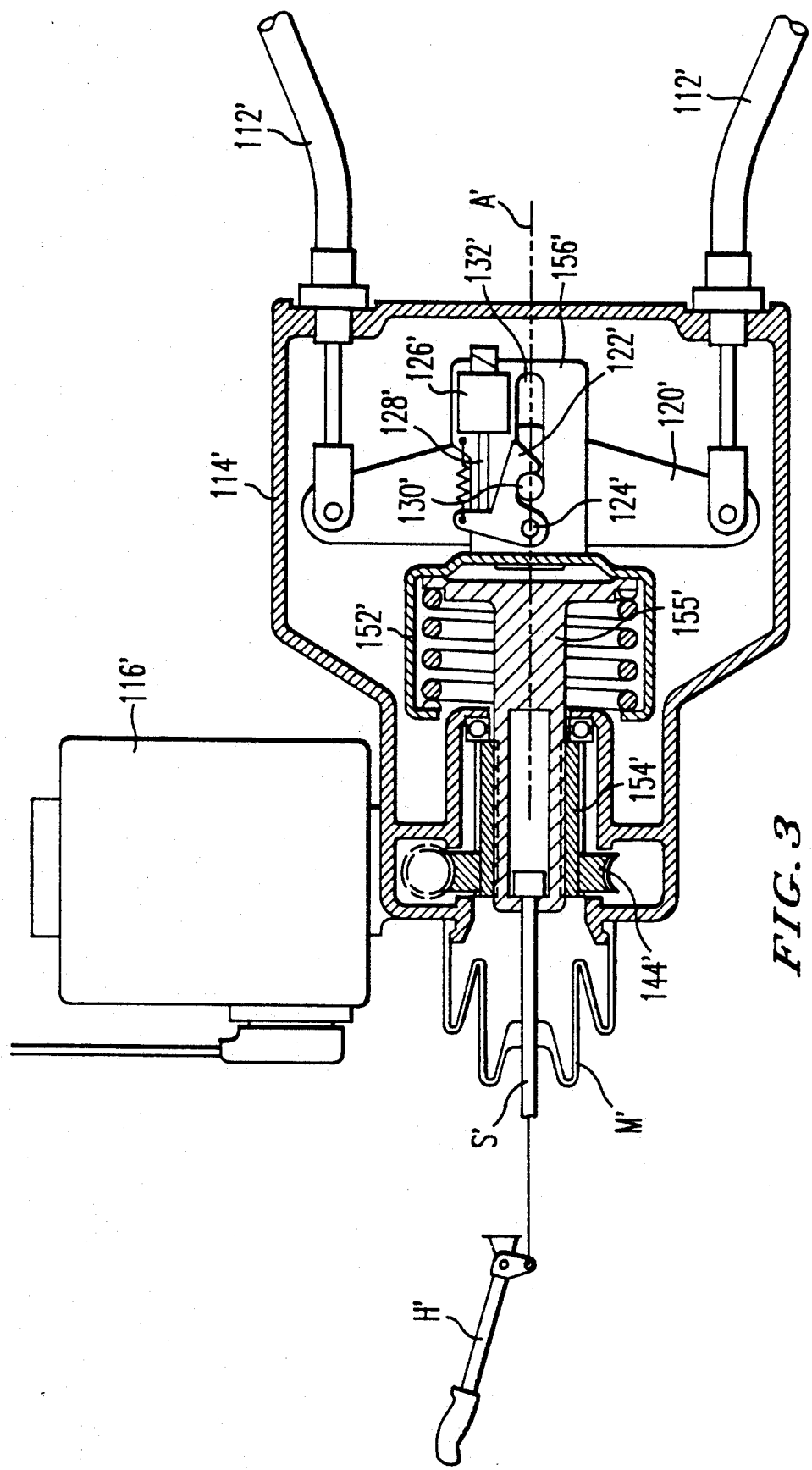
FIG. 3 shows another example of embodiment of an auxiliary brake in section.

FIG. 3 shows a modification of the auxiliary brake according to FIG. 2 described above. Components corresponding to each other in function are provided with the same reference numerals amplified by an apostrophe. In addition to the examples of embodiment of FIG. 2, FIG. 3 also shows a brake hand lever H' which is connected via a rod S' to the components acting on the Bowden cable 112'. The function of the auxiliary, brake according to FIG. 3 is very similar to that of FIG. 2. On actuation of the electric motor 116' the worm drive 144' shifts a sleeve 154' to the left in FIG. 3. The sleeve 154' is fixedly connected to a housing 152' which in turn is fixedly connected to a pulling body 156' to which both Bowden cables 112' are attached via a pin 130' and a blocking lever 122' in accordance with the position shown in FIG. 3. In the event of a danger of locking or loss of steering stability of the vehicle, via a solenoid 126' and a push member 128' the blocking lever 122' is pressed anticlockwise so that the pin 130' in the slot 132' illustrated is freed and no more force is transmitted to the Bowden cables 112'.

Figure 4:
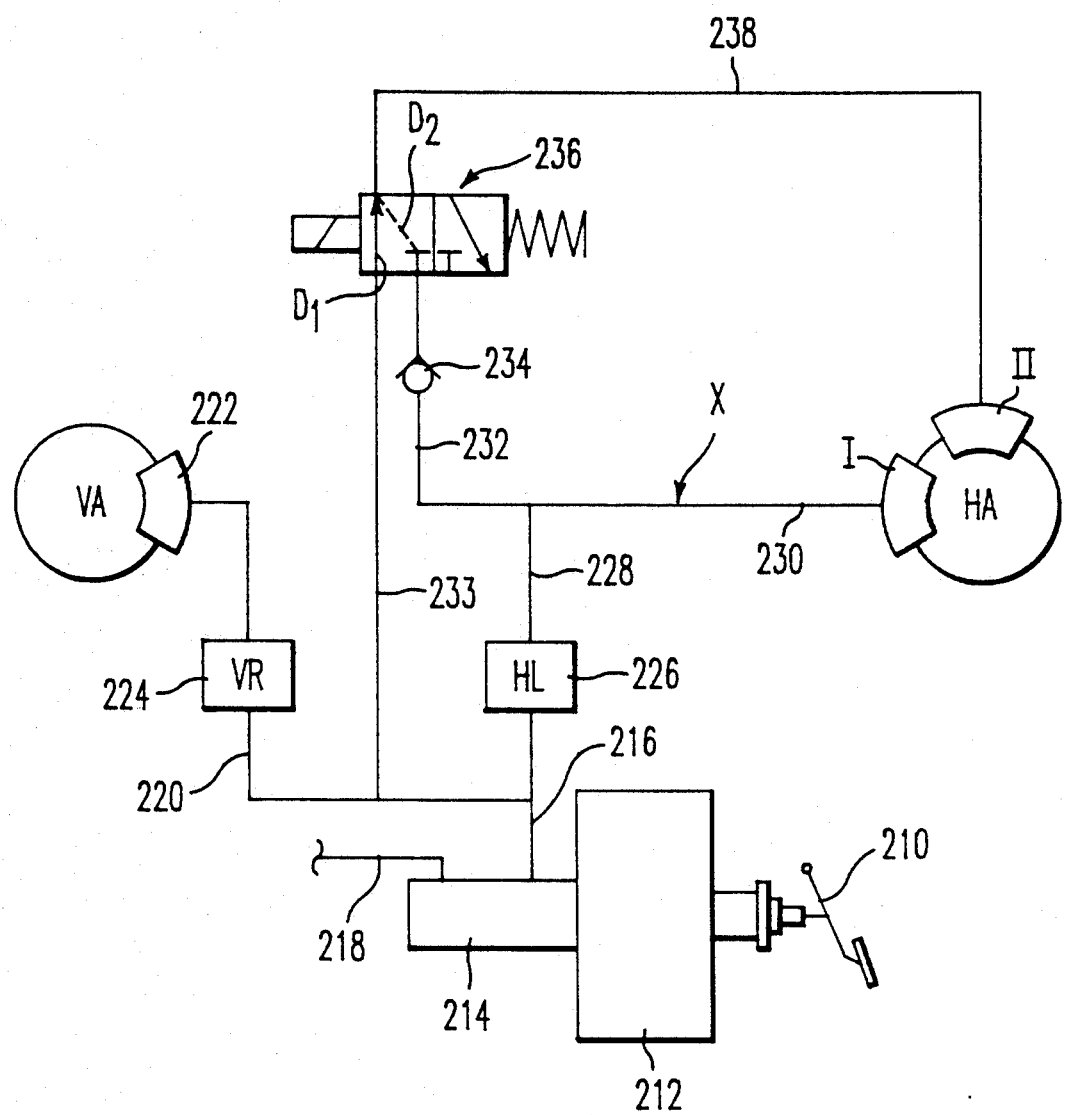
FIG. 4 shows schematically a single hydraulic control circuit of a four-channel antilock brake system with diagonal distribution.

FIG. 4 shows schematically a single hydraulic control circuit of a four-channel antilock brake system with diagonal distribution.

In the example of embodiment illustrated in FIG. 4 a brake pedal 210 is connected to a brake booster 212 and in a master cylinder 214 hydraulic fluid is subjected to pressure in accordance with the pedal force and the boosting.

From the master cylinder 214 two conduits 216, 218 are supplied with hydraulic fluid; in FIG. 4 only the control circuit supplied by the conduit 216 for the brake at the front right and the brake at the rear left is indicated.

A branch 220 leads from the conduit 216 to the brake 222 at the front left on the front axle VA. Arranged in the conduit 220 in conventional manner is an antilock modulator member VR for the brake 222 at the front left.

A branch 228 leads from the conduit 216 to a first brake I at the right rear wheel of the rear axle HA. The conduit 228 branches into a conduit 230 and a conduit 232. The conduit 230 leads to the first brake I of the right rear wheel.

Furthermore, the conduit 216 is connected directly to a further conduit 233 which leads to a magnetic valve 236. If a passage D, of the magnetic valve 236 is switched to pass the conduit 233 is connected to a conduit 238 leading to a second brake II at the right rear wheel.

The brakes I and II are each formed as brake calipers both acting on the same disc.

The function of the brakes I and II shown in FIG. 4 is as follows:

On initiating a braking by actuation of the pedal 210 (the braking still being "noncritical" in the above sense), via the conduit 216 pressure is generated in the hydraulic fluid in the conduits 228 and 233. On actuation of the pedal 210 the magnetic valve 236 is also subjected to current and the passage $D_1$ is opened so that via the conduit 238 the brake II is also acted on. The modulator HL 226 for an antilock control at the right rear wheel is operated in conventional manner in dependence upon the measured rotational deceleration and/or the slip.

The modulator VR 224 closes for example at 4 bar so that the brake at the front wheel is only just applied without generating strong braking action.

Now, if the vehicle retardation (determined in conventional manner front the rotational deceleration) exceeds a predetermined threshold value of for example 0.2 g, the central antilock processor passes a control command to the magnetic valve 236 so that simultaneously, the passage $D_1$ is blocked and a passage $D_2$ opened. The passage $D_2$ connects the conduit 238 via a check valve 234 to the conduit 232 leading to the first brake I. Thus, if the braking of the vehicle reaches the predetermined critical value of for example 0.2 g the two brakes I and II provided at the right rear wheel are hydraulically "short-circuited", i.e. they are both supplied with braking pressure only under the control of the ABS modulator 226.

On switching from the open passage $D_1$ to the open passage $D_2$ the hydraulic fluid in the brake II expands into the brake I if the brake I was previously subjected to a smaller braking pressure than the brake II.

If an antilock control is then effected, by means of the modulator 226 both the pressure in the brake I and in the brake II is maintained or diminished. The modulator 224 correspondingly controls the pressure in the brake of the diagonally disposed right front wheel.

If the antilock processor recognizes that an "antilock control case" is not present (i.e. no tendency of the right rear wheel to lock) and the vehicle retardation is less than the predetermined value of 0.2 g, the passage $D_1$ is opened again and the brake II supplied with pressure directly via the conduit 233.

At the point X in the conduit 230 a pressure reducing valve known per se may be arranged and can be bypassed in the manner described via the conduits 233, 238.

I claim:

1. In brake apparatus for a vehicle having front and rear wheels, rotational speed sensors at least at the rear wheels, circuit means for evaluating the rotational speeds and determining the rotational deceleration of said rear wheels, and means responsive to the determined deceleration of said rear wheels for controlling the braking forces at said front and rear wheels, the invention wherein said means for controlling said braking forces is responsive to deceleration of said rear wheels below a predetermined value to generate a braking force on the rear wheels which is greater than that on the front wheels so long as said deceleration remains below said predetermined value, said controlling means being responsive to deceleration of said rear wheels in excess of said predetermined value to cancel said greater braking force on said rear wheels and subject both the front and rear vehicle wheels to optimum braking force.

2. In the brake apparatus of claim 1 including means for detecting transverse acceleration of the vehicle and wherein said brake controlling means is responsive to said transverse acceleration detecting means to supply greater braking force to said rear wheels than to said front wheels as long as said vehicle undergoes no transverse acceleration.

3. Brake apparatus according to claim 2 wherein when the vehicle undergoes a transverse acceleration said brake controlling means supplies braking force to both the front and rear wheels.

4. Brake apparatus according to claim 2 including means for measuring velocity of the vehicle, wherein said brake controlling means is responsive to said velocity measuring means to supply braking force to said rear wheels which is greater than the force supplied to the brakes of the front wheels only if the velocity of the vehicle is lower than a predetermined value.

5. In the brake apparatus of claim 2 including steering means for a vehicle, and means for detecting the steering angle of said steering means, wherein said brake controlling means is responsive to said steering angle detecting means to supply greater braking force to said rear wheels than to said front wheels only so long as the steering angle does not exceed a predetermined value.

6. Brake apparatus according to claim 2 including means for measuring gradient with which braking pressure rises on commencement of braking, wherein said brake controlling means is responsive to said gradient measuring means to supply a greater braking force to said rear wheels than to said front wheels so long as the measured gradient is less than a predetermined value.

7. In the brake apparatus of claim 2 wherein said vehicle has at least a rear axle and means for measuring load on said rear axle, wherein said brake controlling means is responsive to said load measuring means to supply a greater braking force to said rear wheels than to said front wheels only if the measured rear axle load exceeds a predetermined value.

8. Brake apparatus for an at least two-axle vehicle having speed sensors at least at the rear wheels of the vehicle and a circuit for evaluating rotational speeds and for determining rotational deceleration of the wheels, the vehicle having front and rear wheel brakes and having a hydraulic control circuit for controlling said brakes of the front and rear wheels and also having an auxiliary brake acting on the rear wheels, means for controlling said auxiliary brake independently of the hydraulic control circuit, and means responsive to actuation of the hydraulic control circuit for automatically actuating said auxiliary brake for as long as the rotational deceleration of the rear wheel remains below a predetermined value.

9. Brake apparatus according to claim 8, including manual means for actuating said auxiliary brake independently of actuation of the hydraulic control circuit.

10. Brake apparatus according to claim 8 including a servo motor operatively connected to said auxiliary brake for mechanically actuating the same.

11. Brake apparatus according to claim 10 including a manually operable electrical switching contact for controlling said servo motor.

12. Brake apparatus according to claim 8 including a brake pedal, means for measuring an actuating force exerted on said brake pedal, and means for actuating said auxiliary brake when the measured actuating force applied to said brake pedal is below a predetermined value.

13. Brake apparatus for an at least two-axle vehicle having front and rear wheel brakes rotational speed-sensors at least at the rear wheels of the vehicle and a circuit for evaluating the rotational speeds and for determining the rotational deceleration of the wheels, a hydraulic circuit for controlling said front and rear wheel brakes, and an auxiliary brake at said rear wheels which is likewise actuable by said hydraulic control circuit for as long as the rotational deceleration of said rear wheels remains below a predetermined value.

14. Brake apparatus according to claim 13 including a disc brake comprising a disc and caliper at each of the rear wheels, said auxiliary brake including a second caliper operable upon a disc at each of said rear wheels.

* * * * *